(12) United States Patent
Cardiff

(10) Patent No.: US 6,915,113 B1
(45) Date of Patent: Jul. 5, 2005

(54) TEST APPARATUS FOR RF RECEIVER

(75) Inventor: Barry Cardiff, Farnham (GB)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 10/030,220

(22) PCT Filed: Jul. 14, 2000

(86) PCT No.: PCT/GB00/02708

§ 371 (c)(1),
(2), (4) Date: Sep. 12, 2002

(87) PCT Pub. No.: WO01/06684

PCT Pub. Date: Jan. 25, 2001

(Under 37 CFR 1.47)

(30) Foreign Application Priority Data

Jul. 16, 1999 (GB) ............................................. 9916775

(51) Int. Cl.[7] .............................................. H04B 17/00
(52) U.S. Cl. .................... 455/67.14; 455/504; 375/224
(58) Field of Search .......................... 455/67.11, 67.14, 455/423, 522, 67.15, 504, 65, 24, 10, 9; 375/224, 219, 220, 221, 225, 223

(56) References Cited

U.S. PATENT DOCUMENTS

| 4,100,531 A | * | 7/1978 | Fletcher et al. ............. 375/225 |
| 4,580,274 A | * | 4/1986 | Debany et al. ............. 375/228 |
| 4,977,607 A | * | 12/1990 | Maucksch et al. ............ 455/10 |
| 5,062,148 A | * | 10/1991 | Edwards ...................... 455/506 |
| 5,109,535 A | * | 4/1992 | Kume et al. ............. 455/67.15 |
| 5,337,014 A | * | 8/1994 | Najle et al. .................. 324/613 |
| 5,539,772 A | | 7/1996 | Fasulo, II et al. .......... 375/224 |
| 5,574,984 A | * | 11/1996 | Reed et al. .................... 455/69 |
| 5,604,728 A | * | 2/1997 | Jylha .......................... 370/241 |
| 5,790,944 A | * | 8/1998 | Karki et al. ............. 455/226.2 |
| 5,862,455 A | | 1/1999 | Martin et al. .............. 455/67.7 |
| 6,061,394 A | * | 5/2000 | Itahara ........................ 375/227 |
| 6,148,194 A | * | 11/2000 | Kao et al. .................... 455/421 |

FOREIGN PATENT DOCUMENTS

| EP | 0 891 113 A2 | 1/1999 | |
| WO | 89/12364 | 12/1989 | ........... H04B/17/00 |
| WO | WO 00/33491 A1 * | 6/2000 | ........... H04B/17/00 |
| WO | 01/06684 | 1/2001 | ........... H04B/17/00 |

OTHER PUBLICATIONS

International Search Report.
Annex to the International Search Report on International Application No. PCT/AU89/00254.

* cited by examiner

*Primary Examiner*—Charles Appiah
(74) *Attorney, Agent, or Firm*—Antonelli, Terry, Stout & Kraus, LLP

(57) ABSTRACT

Test apparatus for generating a test signal for use in determining the performance of a receiver, the apparatus comprising signal generating means for generating a test signal; fading means arranged to modify the test signal to represent a signal having the fading characteristic of a RF signal transmitted between a transmitter and a receiver; a comparitor for comparing a signal characteristic of the modified signal with a signal characteristic of a reference signal; and control means responsive to the comparitor for compensating for variations between the modified signal and the reference signal by controlling the test signal power.

15 Claims, 2 Drawing Sheets

TEST APPARATUS FOR RF RECEIVER

BACKGROUND FOR THE INVENTION

1. Field of the Invention

This invention relates to apparatus and a method for generating a test signal or use in determining the performance of a receiver.

2. Description of the Prior Art

An important measure of a receiver's performance is its sensitivity and one means for measuring this sensitivity is to compare the measured bit error rate (BER) of a received signal with the signal to noise ratio.

The main factors that effect the measured BER for a given receiver are channel noise (e.g. thermal noise, noise of other transmitted signals and interference from other communication channels) and multipath propagation. Of these two effects multipath propagation can, if not compensated for, have the most significant effect on BER.

Multipath propagation occurs where two or more different propagation paths exist between a transmitter and a receiver. For example, a second path may come into existence if a reflective surface (e.g. from a nearby building) provides an alternative path between the transmitter and receiver. The combination of the two paths at the receiver causes frequency-dependent attenuation, frequency-dependent phase nonlinearity and delayed response effects.

The channel effects resulting from multipath propagation vary depending on whether the channel is narrow or wide band.

Multipath propagation in a narrowband channel can result in fast fading characteristics when the transmitter/receiver or medium is in motion. The rate of fading is proportional to the velocity between the transmitter and receiver.

Multipath propagation in a wideband channel results in frequency selective fading (i.e. the signal fading at different frequencies within the channel vary independently).

The fading (i.e. a varying increase/decrease in signal strength) occurs due to constructive and destructive interference between the multipaths.

Ideally the BER measurement for a receiver would be conducted under realistic real life conditions. However, to do so would require a fully designed receiver operating under a variety of different conditions (e.g. in different types of area, with the receiver moving at different velocities).

However, to simplify the BER measurement process and to allow the receiver performance to be tested at an early stage of the design, various models have been developed for modeling the channel propagation characteristics between a transmitter and a receiver. The use of these models enables a receiver's performance to be determined for different channel propagation conditions in a laboratory at an early stage of the receiver's design and for field testing a receiver (e.g. type approval test of products).

Additive White Gaussian Noise (AWGN) is used to model the channel noise. AWGN has a constant energy density independent of frequency and closely matches the measured noise on a channel.

Typically a receiver's performance will decrease as the channel noise increases (i.e. the measured BER of a receiver will increase as the channel noise increases).

The fading effects resulting from multipath propagation are modeled using either a Ricean or Rayleigh probability density function.

A Ricean fading model is typically used for modeling a channel where the line of sight path is dominant. A Rayleigh fading model, a special case of the more general Ricean model, is typically used for modeling a channel that does not have a dominant propagation path.

Using the channel fading models wireless receiver designers are able to model channel characteristics for a variety of different conditions (e.g. different speeds at which a mobile receiver may be moving, urban or city environments) in a laboratory. Accordingly, these channel models can be used to determine the performance of a receiver over a variety of different conditions at an early stage of the receiver's design and for field testing a receiver (e.g. type approval test of products).

Some channel models will cause bit errors to occur in a receiver when modeling long lasting fades. However, for a receiver having a power control RF link the receiver's power control mechanism will in operation work to reduce these fades. Therefore these channel models will give pessimistic performance estimates compared to actual measured results.

It would be desirable to improve this situation.

SUMMARY OF THE INVENTION

In accordance with a first aspect of the present invention there is provided test apparatus for generating a test signal for use in determining the performance of a receiver, the apparatus comprising a signal generator which generates a test signal; a fading model arranged to modify the test signal to represent a signal having the fading characteristic of a RF signal transmitted between a transmitter and the receiver; a comparitor for comparing a signal characteristic of the modified signal with a signal characteristic of a reference signal; and a control responsive to the comparitor, which compensates for variations between the modified signal and the reference signal by controlling the test signal power.

This invention provides the advantage of allowing the performance of a RF receiver having a power control RF link to be modeled by incorporating within the channel model a model of the power control loop. Consequently, the present invention allows receivers to be designed using realistic design estimates.

Preferably, a time lag is introduced between the modifying of the test signal and the controlling of the test signal power. When using a receiver having a power control RF link in a real network the transmitted signal power should vary according to the networks power control algorithm. However, the actual power control changes may be delayed, for example, as a result of the power control update rate, the time taken to make signal measurements. Preferably, the length of the time lag is selected to represent the time delay that would result when a receiver is used in an actual network.

In accordance with a second aspect of the present invention there is provided a method for generating a test signal for use in determining the performance of a receiver, the method comprising generating a test signal; modifying the test signal to represent a signal having the fading characteristic of a RF signal transmitted between a transmitter and the receiver, comparing a signal characteristic of the modified signal with a signal characteristic of a reference signal; and compensating for variations in the characteristic between the modified signal and the reference signal by controlling the test signal power.

BRIEF DESCRIPTION OF THE DRAWINGS

For a better understanding of the present invention and to understand how the same may be brought into effect reference will now be made, by way of example only, to the accompanying drawings, in which.

DESCRIPTION OF THE PREFERRED EMBODIMENT

An embodiment of the invention will now be described with reference to the testing of a radiotelephone suitable for operation in a WCDMA cellular telephone network. However, the test equipment is suitable for testing other types of receivers.

Figure 1:
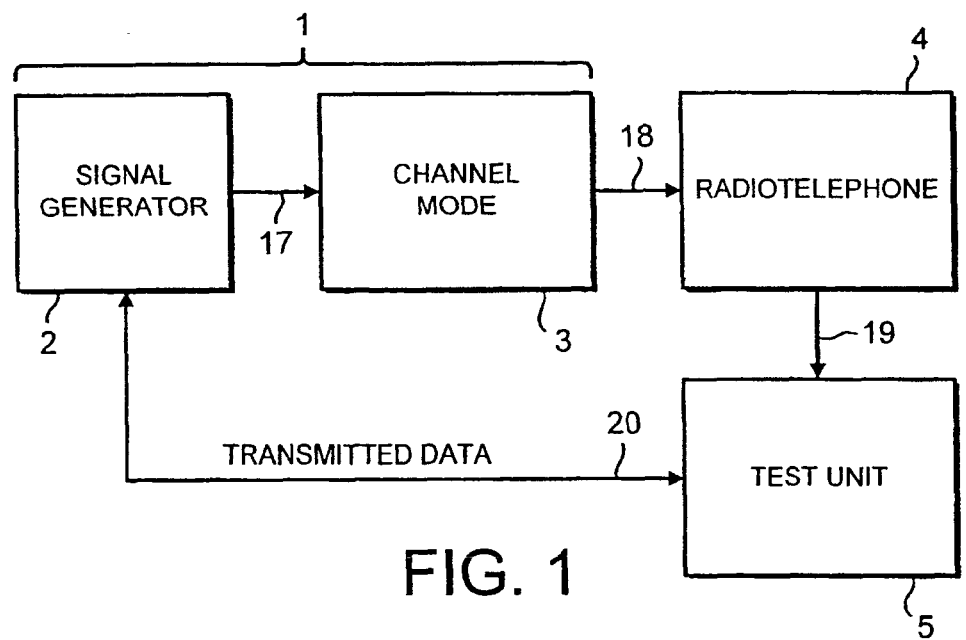
FIG. 1 is a schematic block diagram of a test arrangement incorporating test apparatus according to the present invention.

FIG. 1 shows test apparatus 1 suitable for simulating different signal propagation environments within which a receiver (e.g. a radiotelephone) may be required to operate, thereby allowing the sensitivity of a receiver to be tested for the different environments under which the receiver may operate. Typically the sensitivity of a receiver is measured by measuring the BER of a signal received by the receiver. However, other types of measurements may be used, for example frame error rate (FER). The main causes of signal variations that result in a receiver being unable to accurately recover data are channel noise interference and multipath propagation.

The test apparatus 1 includes a signal generator 2 and a channel model 3. The signal generator 2 is coupled to channel model 3, which in turn is coupled to radiotelephone 4. A test unit 5 is coupled to radiotelephone 4 and signal generator 2.

The signal generator 2 simulates a transmitter, for example a base station in a cellular network. However, to minimize emitted RF radiation the signal generator preferably generates a simulated RF signal. The signal can, however, be transmitted as an I and Q signal, a RF signal or an intermediate frequency signal.

The signal generator 2 provides a test signal 17 to channel model 3 either as a simulated RF signal, I and Q data, an intermediate frequency signal or as a transmitted RF signal, as described above. The test signal 17 incorporates a pseudorandom bit sequence. The channel model 3 simulates the communication channel between a basestation and a radiotelephone for a variety of different signal propagation environments within which a radiotelephone may be required to operate, for example different numbers of users within a given area, different speeds at which a radiotelephone may be moving and areas of different terrain. The channel model 3 imparts to test signal 17 the channel effects of one of a plurality of different channel conditions, as described below, resulting in a modified signal 18. The channel conditions are typically selected by a user of test apparatus 1, typically via a computer interface (not shown).

The channel model 3 provides the modified signal 18 to radiotelephone 4, which attempts to recover the pseudorandom bit sequence. The radiotelephone 4 provides the recovered pseudorandom bit sequence to test unit 5, via link 19. The test unit 5 calculates the BER of the modified signal 18 recovered by the radiotelephone 4, for the channel conditions simulated in the channel model, by comparing the recovered psuedorandom bit sequence with the transmitted pseudorandom bit sequence provided by signal generator 2, via link 20, test unit 5.

Radiotelephone 4 can be an actual radiotelephone or a simulation of a radiotelephone under design, thereby allowing the radiotelephone sensitivity to be tested during the design process.

FIG. 1 shows the signal generator 2, channel model 3, test unit 5 and radiotelephone 4 as separate units. However, some or all of the elements can be combined into a single test unit.

Figure 2:
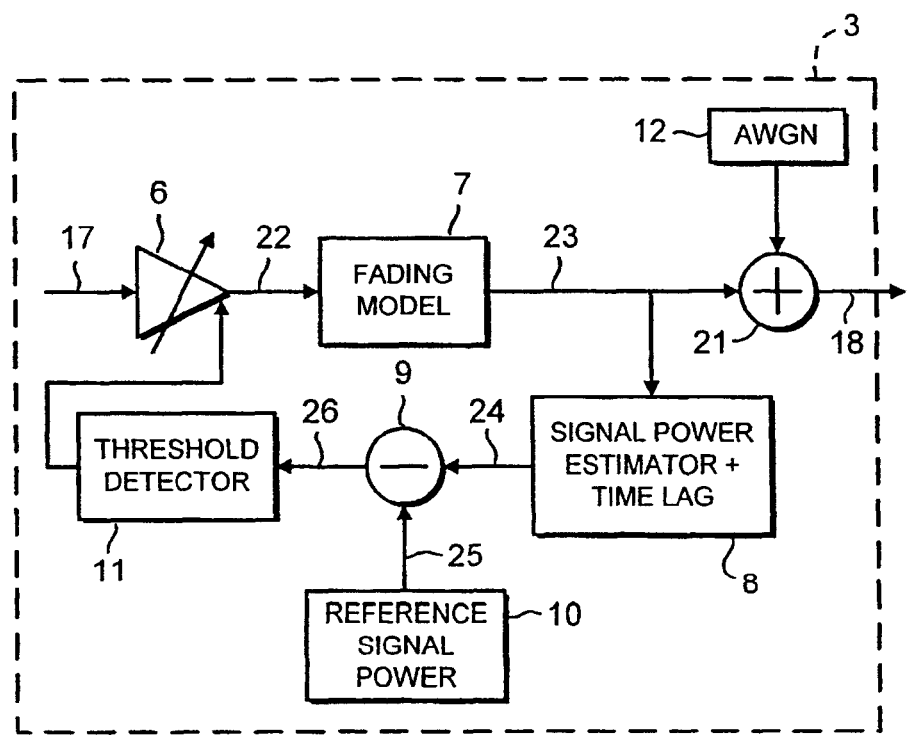
FIG. 2 is a schematic block diagram of test apparatus according to the present invention.

FIG. 2 shows the channel model 3, which simulates a communication channel between a transmitter and receiver having a power control RF link, for example a radiotelephone which operates in a cellular network (e.g. GSM, PDC and WCDMA).

Channel model 3 has a variable gain amplifier 6 that has an output coupled to the input of a fading model 7. The output of the fading model 7 is coupled to a first input of a summer 21, with the second input of the summer 21 being coupled to an AWGN generator 12. The variable gain amplifier 6 receives test signal 17 at its input and the summer 21 produces the modified signal 18 at its output. A signal power estimator 8 is coupled to the output of fading model 7 and input of summer 21. The signal power estimator 8 is coupled to a first input of a comparitor 9. A reference signal power generator 10 is coupled to a second input of the comparitor 9. The output of the comparitor 9 is coupled a threshold detector 11. The output of the threshold detector 11 is coupled to the controlling input of the variable gain amplifier 6, completing a feedback loop:

Test signal 17 is input to variable gain amplifier 6. The variable gain amplifier 6 controls the test signal power in accordance with information provided by comparitor 9, via threshold detector 11, as described below. Variable gain amplifier 6 provides the power adjusted test signal 22 to fading model 3.

Fading model 3 imparts to test signal 22 the effects of fading for a set of channel conditions, resulting in a modified signal 23. The type of fading is selectable depending upon the type of environment a tester wishes to simulate. For example, the fading model 7 can be selected to model single path fading or multipath fading using either a Rayleigh probability density function or Ricean probability density function as is well known to a person skilled in the art. The input criteria, for example distance between transmitter and receiver, velocity of receiver, and type of terrain are selectable by the tester, typically via a computer interface (not shown).

Figure 3A:
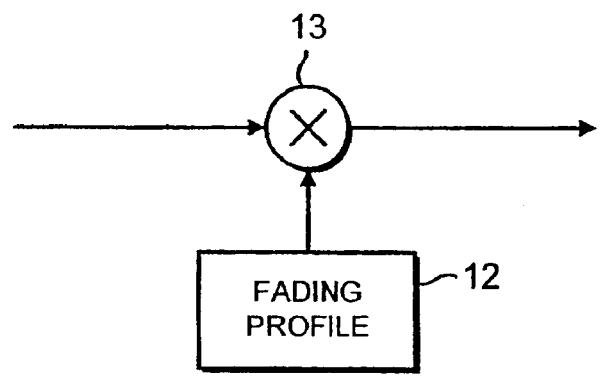
FIG. 3a is a representation of a single path fading model.
Figure 3B:
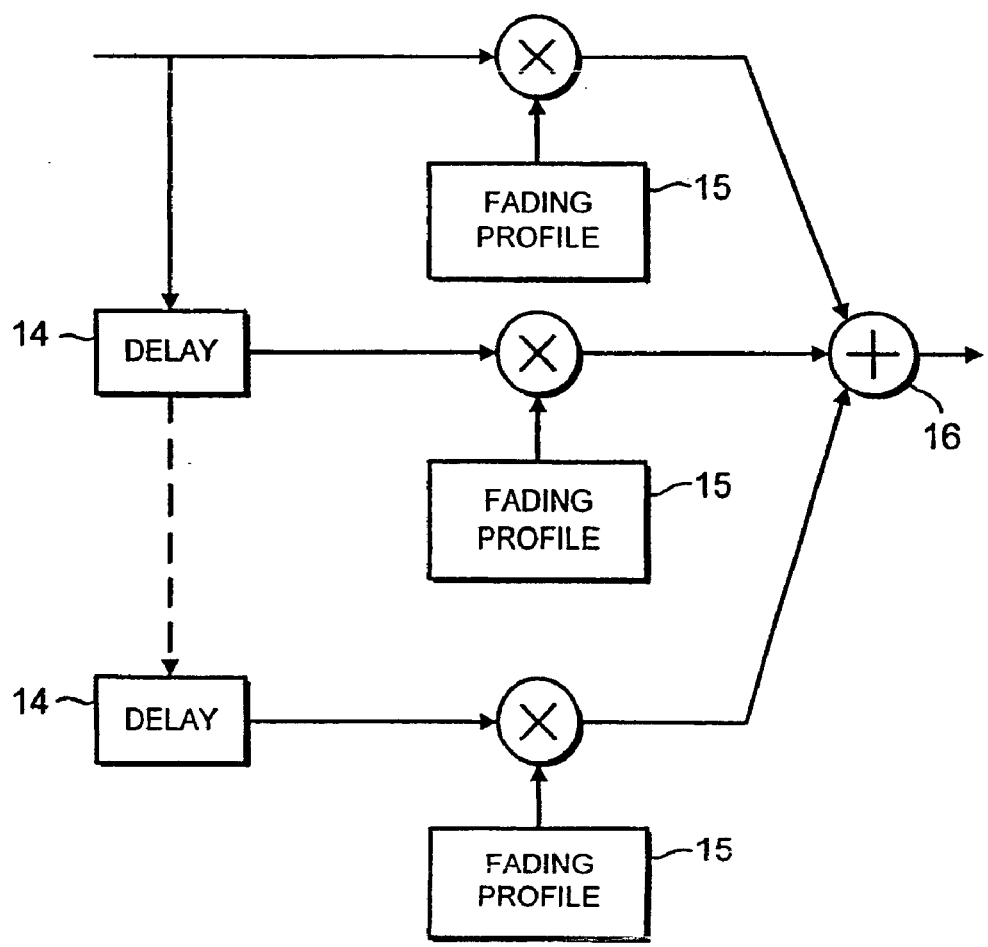
FIG. 3b is a representation of a multipath fading model.

FIGS. 3a and 3b show examples of possible fading models that may be incorporated within fading model 3, as is well known in the art. FIG. 3a shows a representation of a single path model where the fading profile 12 for a channel is multiplied, by multiplier 13, with the test signal 22. FIG. 3b shows a representation of a multipath fading model where each one of the different paths is modeled by a different delay 14 and/or a different fading profile 15. The different simulated signals for each path are multiplied by multiplier 13 with test signal 22, and then combined by summer 16.

The fading model 7 provides the modified signal 23 to summer 21. The summer 21 sums the modified test signal 23 with modeled channel noise generated by AWGN probability density function 12. The modified test signal 18 output from the summer is provided to radiotelephone 4.

Fading model 7 also provides modified signal 23 to signal power estimator 8. Signal power estimator 8 determines the power, or representative power if the signal is simulated, of the modified signal 23. The signal power estimator 8 is also capable of introducing a time lag to represent time delays in an actual communication system, as described below.

The power estimator 8 provides a signal 24 indicative of the signal power of the modified signal 23 to comparitor 9 which compares the estimated output signal power with a reference signal power 25 supplied by reference signal power generator 10. The comparitor 9 provides a signal 26 indicative of the difference in power between the reference signal power 25 and estimated output signal power to the threshold detector 11. If the estimated signal power is above or below the respective upper or lower threshold value of the threshold detector 11the threshold detector 11 controls the variable gain amplifier 6 to adjust the power of the test signal 17 to compensate for variations of the power of the modified signal 23 compared to the reference signal power 25. The use of the threshold detector 11 avoids rapid fluctuations in input signal power, however the variable gain amplifier 6 can be controlled by the comparitor 9 without the need for a threshold detector 11.

In order to simplify the channel model all noise from other users, channel noise and receiver noise has been combined together and is represented by the AWGN probability density function 12. This means that signal to noise ratio (SNR) approximates signal to interference ratio (SIR). Therefore, the AWGN probability density function 12 does not need to be incorporated within the power control loop described above. However, the AWGN function 12 can be incorporated within the power control loop 6, 8, 9, 10, 11, as described above, and can be used model the effects of SNR and SIR within a communication channel.

The use of the test apparatus 1 to test the sensitivity of a WCDMA radiotelephone will now be described.

WCDMA standards require that the transmitted RF signal power in a WCDMA network be controlled. First, to ensure that all radiotelephones transmissions received at the basestation receiver are within a specified power range, thereby preventing one radiotelephone signal from drowning out other radiotelephone signals. Secondly, to maximize the number of users that can share the same cell. Therefore, when a radiotelephone detects a received signal having a SIR value above or below a specified value the radiotelephone requests the basestation to vary the signal power, thereby maintaining the SIR value of the received signal at a specified value.

The radiotelephone controls the transmitted power via fast power control messages transmitted to the basestation. Each individual power control message can request a signal power change of 1 dB.

To minimize the delay in varying the power levels the fast power control messages have an update rate of 1.6 kHz. Therefore, the signal power transmitted by the basestation can be varied by 1 dB every 625 µsecs.

The power control in a WCDMA network operates to compensate for variations in distance between the basestation and the radiotelephone and for fades longer than a duration of 625 µsecs. Typically for fades less than 625 µsecs channel coding is used to recover lost data.

Therefore, to accurately test the sensitivity of a radiotelephone the test apparatus feedback loop 6, 8, 9, 10,11 described above is arranged to have the same, or similar, characteristics to the WCDMA power control mechanism. Therefore, the reference signal power 10 and signal threshold characteristics are set to correspond to the values used in the WCDMA network. In addition, a delay is introduced into the loop, preferably incorporated within the power control estimator 8, to model delays resulting from the actual network and radiotelephone, for example to take account of the fast power control update rate, the time taken by the radiotelephone to measure the signal power level and the time taken by the base station to change signal power.

In view of the foregoing description it will be evident to a person skilled in the art that various modifications may be made within the scope of the invention. For example, it will be appreciated that a control other than the signal generator 2 can generate the pseudorandom bit sequence, the test apparatus 1 can be used to test the basestation receiver, and the signal generator 2 can be controlled to vary the signal power.

What is claimed is:

1. A test apparatus for generating a test signal for use in determining the performance of a receiver, the apparatus comprising a signal generator which generates a test signal;

a fading model arranged to modify the test signal to a modified signal having a fading characteristic of a RF signal transmitted between a transmitter and the receiver;

a comparator which compares a signal characteristic of the modified signal with a signal characteristic of a reference signal; and a control, responsive to the comparator, which compensates for variations between the modified signal and the reference signal by controlling the test signal power.

2. A test apparatus according to claim 1, further comprising a delay for introducing a time lag between the modifying of the test signal and the controlling of the test signal power.

3. A test apparatus according to claim 1, wherein the test signal contains a pseudorandom bit sequence.

4. A test apparatus according to claim 1, wherein the fading model modifies the test signal according to at least one of a plurality of RF paths between the transmitter and the receiver.

5. A test apparatus according to claim 4, wherein the RF path characteristics can be varied dynamically.

6. A test apparatus according to claim 1, further comprising which compares the modified signal received by the receiver with the generated test signal.

7. A test apparatus according to claim 1, wherein the test signal is a RF test signal.

8. A test apparatus according to claim 1, wherein the test signal is an I and Q test signal.

9. A test apparatus according to claim 1, wherein the test signal is a simulated RF test signal.

10. A test apparatus according to claim 1, comprising a power estimator which estimates the power of the modified signal, wherein the compared signal characteristic is the signal power.

11. A test apparatus according to claim 1, comprising a power estimator which estimates the power of the modified signal, wherein the compared signal characteristic is the signal to interference ratio.

12. A test apparatus according to claim 1, comprising a power estimator which estimates the power of the modified signal, wherein the compared signal characteristic is the signal to noise ratio.

13. A test apparatus according to claim 1, wherein the fading characteristic corresponds to Rayleigh fading.

14. A test apparatus according to claim 1, wherein the fading characteristic corresponds to Ricean fading.

15. A method for generating a test signal for use in determining the performance of a receiver, the method comprising generating a test signal;

modifying the test signal to a modified signal having the fading characteristic of a RF signal transmitted between a transmitter and the receiver;

comparing a signal characteristic of the modified signal with a signal characteristic of a reference signal; and compensating for variations in the characteristic between the modified signal and the reference signal by controlling the test signal power.

* * * * *